United States Patent [19]

Kim

[11] Patent Number: 5,442,617
[45] Date of Patent: Aug. 15, 1995

[54] DIGITAL NOISE BLANKING CIRCUIT OF CD-ROM SYSTEM

[75] Inventor: Gee-Bong Kim, Suwon-city, Rep. of Korea

[73] Assignee: Samsung Electronics Co., Ltd., Kyungki-Do, Rep. of Korea

[21] Appl. No.: 121,485

[22] Filed: Sep. 16, 1993

[30] Foreign Application Priority Data

Sep. 16, 1992 [KR] Rep. of Korea ............... 92-16820

[51] Int. Cl.[6] .................................. G11B 7/00
[52] U.S. Cl. ............................ 369/124; 369/47; 369/54; 330/51
[58] Field of Search ............ 369/44.28, 124, 54, 369/58, 47, 48; 330/51, 297; 307/246

[56] References Cited

U.S. PATENT DOCUMENTS

| | | | |
|---|---|---|---|
| 3,832,627 | 8/1974 | Ohsawa | 307/246 |
| 4,181,895 | 1/1980 | Yoshida | 330/51 |
| 4,441,086 | 4/1984 | Karlow et al. | 330/297 |
| 4,486,720 | 12/1984 | Hirano | 330/51 |
| 4,611,101 | 9/1986 | Walter et al. | 179/175.3 |
| 4,673,889 | 6/1987 | Cini et al. | 330/51 |
| 4,710,771 | 12/1987 | Banno et al. | 340/811 |
| 5,016,953 | 5/1991 | Moss et al. | 350/3.66 |
| 5,029,005 | 7/1991 | Morris, Jr. | 330/51 |
| 5,148,417 | 9/1992 | Wong et al. | 369/44.28 |
| 5,151,942 | 9/1992 | Sasaki | 330/51 |
| 5,199,079 | 3/1993 | Anderson et al. | 330/51 |
| 5,255,094 | 10/1993 | Yong et al. | 330/51 |

FOREIGN PATENT DOCUMENTS

| | | |
|---|---|---|
| 56-123111 | 9/1981 | Japan . |
| 57-174907 | 10/1982 | Japan . |
| 58-090813 | 5/1983 | Japan . |
| 60-227548 | 11/1985 | Japan . |
| 60-229507 | 11/1985 | Japan . |
| 1233824 | 9/1989 | Japan . |

*Primary Examiner*—Scott J. Sugarman
*Assistant Examiner*—P. W. Huber
*Attorney, Agent, or Firm*—Sughrue, Mion, Zinn, Macpeak & Seas

[57] ABSTRACT

A digital noise blanking circuit associated with a Compact Disk-Read Only Memory (CD-ROM) system for preventing a digital noise from being output during power on/off and a computer re-set includes a first mute controller for providing a first mute signal for eliminating a digital noise generated during a power on/off, a second mute controller for providing a second mute signal for eliminating the digital noise generated during a reset of the computer operation and a muting circuit for cutting off the digital noise generated from an audio output terminal of the CD-ROM system by the first and second mute signals output from the first and second mute controller and a third mute signal output from a microcomputer of the CD-ROM system.

20 Claims, 3 Drawing Sheets

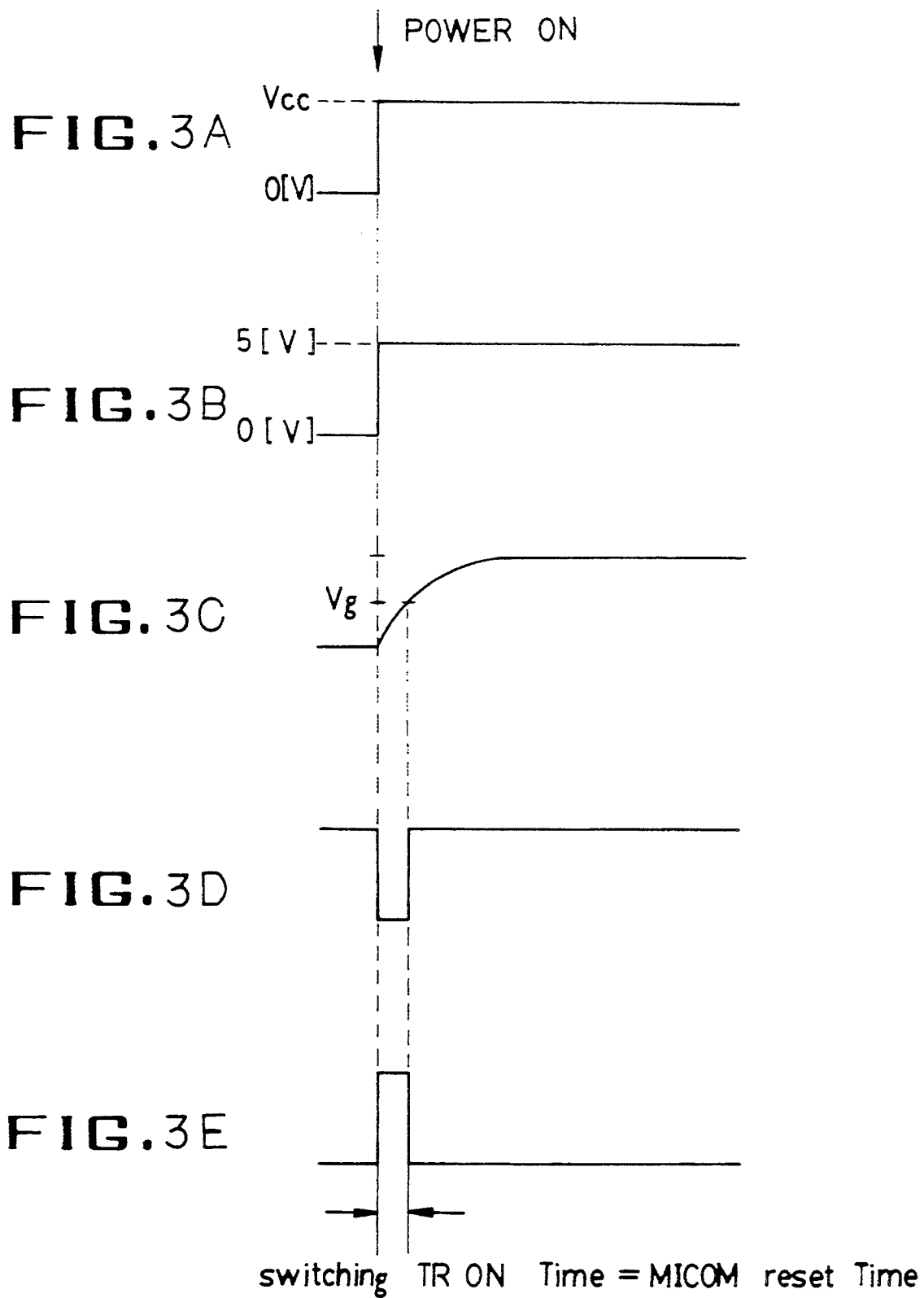

DIGITAL NOISE BLANKING CIRCUIT OF CD-ROM SYSTEM

BACKGROUND OF THE INVENTION

1. Field of the Invention

The present invention relates to a Compact Disk-Read Only Memory (CD-ROM) and, more particularly, to a digital noise blanking circuit of a CD-ROM system. The noise blanking circuit advantageously prevents a digital noise from being output during power on/off state change operations and during a computer re-set operation in a CD-ROM system built into a computer system.

Korean Patent Application No. 92-16820 is incorporated herein by reference for all purposes.

2. Description of the Prior Art

It is generally well-known that when using a disc such as a CD-ROM or a CD-I that an audio data and information data are classified and stored at the same time, unlike a Compact Disc Player (CDP), when information is stored in a disc.

However, if a disk storing both the audio data and information data as the CD-ROM or CD-I is to output only information data, e.g., not the audio data, there has been a problem in that a digital noise associated with the information data is output to a speaker or a head phone through an amplifying terminal along with the audio data.

Furthermore, even during a power on/off state change, or during a reset of the computer, there has been a problem in that the digital noise is output through the audio amplifying terminal.

The present invention was motivated by a desire to overcome the recognized problems in the prior art.

SUMMARY OF THE INVENTION

Accordingly, the principal object of the present invention is to prevent digital noise from being output during the power on/off state change or the reset of the computer or while reading only information data.

In accordance with the present invention, the digital noise blanking circuit of CD-ROM system includes a first mute controller for providing a first mute signal for eliminating a digital noise generated during power on/-off, a second mute controller for providing a second mute signal for eliminating the digital noise generated during a computer re-set operation and a muting circuit for cutting off the digital noise generated from an audio output terminal of the CD-ROM system in response to selected ones of the first and second mute signals output from the first and second mute controllers, respectively, and a third mute signal output from a microcomputer of the CD-ROM system.

These and other objects, features and advantages of the invention are disclosed in or apparent from the following description of preferred embodiments.

BRIEF DESCRIPTION OF THE DRAWINGS

A fuller understanding of the nature and objects of the invention can be had by reference to the following detailed description taken in conjunction with accompanying drawings, in which:

FIGS. 3A-3E are illustrative output waveform drawings which are useful in explaining the operation of various element shown in FIG. 1.

DETAILED DESCRIPTION OF PREFERRED EMBODIMENTS

Figure 1:
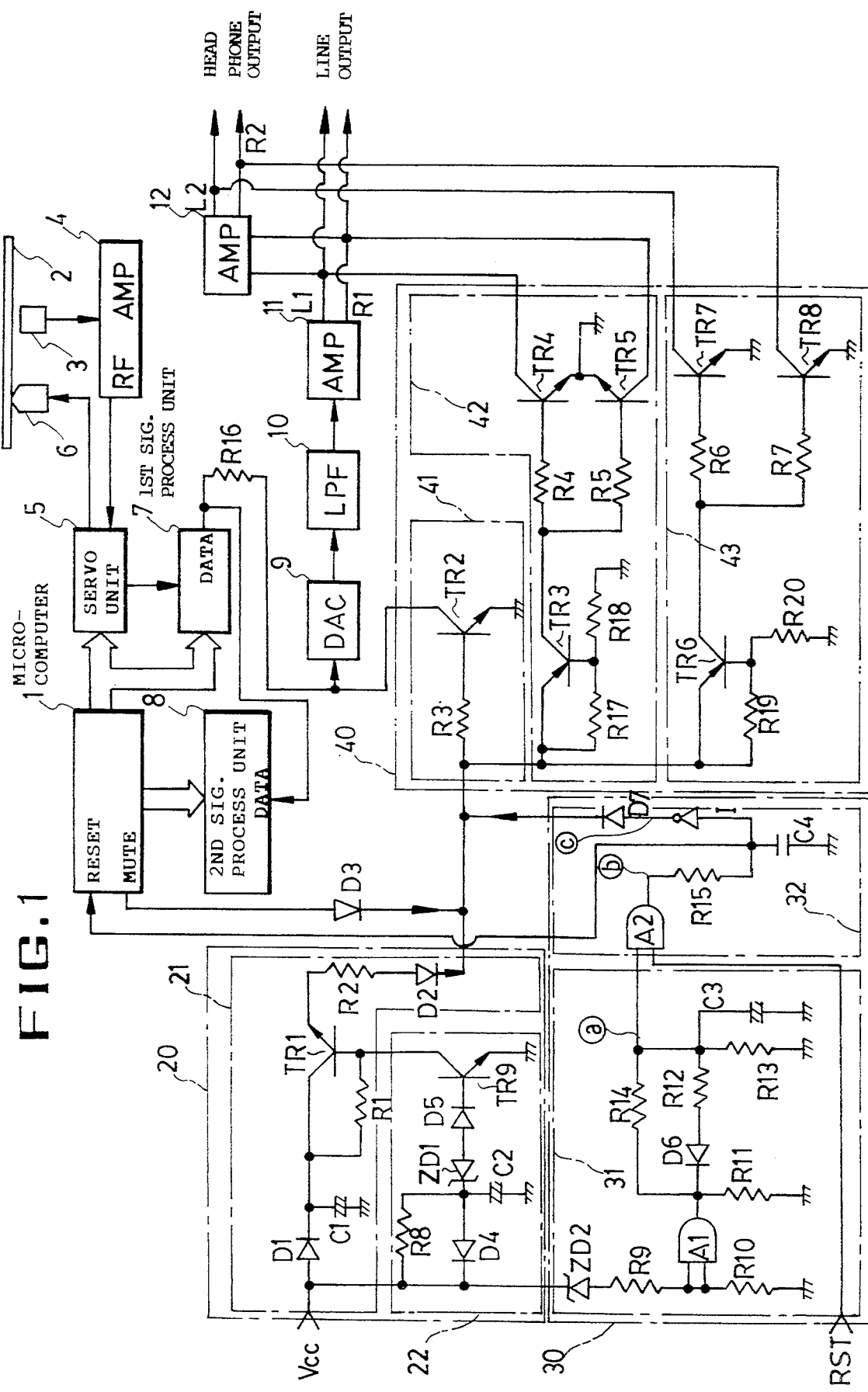
FIG. 1 is a digital noise blanking circuit of a CD-ROM system in accordance with the present invention.

FIG. 1 is digital noise blanking circuit of a CD-ROM system in accordance with the present invention, wherein the blanking circuit comprises:

a first mute controller 20 for providing a first mute signal for eliminating a digital noise generated during a power on/off state change;

a second mute controller 30 for providing a second mute signal for eliminating the digital noise generated during a reset of the computer operation; and a muting circuit 40 for cutting off the digital noise generated from an audio output terminal of the CD-ROM system in response to the first and second mute signals output from the first and second mute controllers 20 and 30 and a third mute signal output from a microcomputer 1 of the CD-ROM system.

In the construction thus described, the first mute controller 20 preferably includes:

a mute signal output circuit 21 for providing the first mute signal during the power on/off; and a mute control circuit 22 for controlling the mute signal output circuit to stop generation of the first mute signal if a predetermined period of time elapses after power-on.

The mute signal output circuit 21 advantageously includes:

a transistor TR1 operating during the power on/off to output the first mute signal;

a condenser C1 maintaining an operational state of the transistor TR1 for a predetermined period of time characteristic of a charging voltage during the power OFF state;

a diode D1 suppressing a discharge of the charging voltage in the condenser C1 during the power OFF state; and a diode D2 for cutting off a signal input to an output terminal from an outside source.

The mute control circuit 22 includes:

a condenser C2 charged according to a predetermined time constant during the power-on state;

a zener diode ZD1 operating when the voltage charge level in the condenser C2 exceeds a predetermined level; and a transistor TR9 cooperating with zener diode ZD1 to control the transistor TR1 of the mute signal output circuit 21 so that the first mute signal can be cut off.

Preferably, the second mute controller 30 comprises:

a delay circuit 31 providing a re-set hold signal during a microcomputer reset time when the power is turned on; and a signal output circuit 32 providing the re-set hold signal coming from the delay circuit, the second mute signal, in response to a selected one of an external re-set signal and a re-set signal.

The delay circuit 31 advantageously includes:

a zener diode ZD2 for operating when a power source is above a predetermined voltage;

an AND gate A1 providing a logic level voltage in accordance with a power source voltage input through the zener diode ZD2; and a condenser C3 being charged for a predetermined time constant when the voltage of logic level coming from the AND gate A1 is input.

Additionally, the signal output circuit 32 comprises:

an AND gate A2 for providing the re-set signal to the microcomputer 1 when the voltage charged in the condenser C3 of the delay circuit is of a predetermined level and an external reset signal RST of logic "1" is applied;

a condenser C4 for eliminating a noise component from the re-set signal to output the same to a RESET terminal of the microcomputer 1 when the re-set signal is input from the AND gate A2;

an inverter I for inverting the re-set signal removed of the noise by the condenser C4 to output the second mute signal; and a diode D7 for cutting off a signal input into an output terminal from the outside.

The above mentioned muting circuit 40, in an exemplary case, includes:

a first muting circuit 41 operated by the first and second mute signals output from the first and second mute controllers 20 and 30 and a third mute signal output from the microcomputer 1 of the CD-ROM system to mute a digital signal output from the CD-ROM system; and second and third muting circuits 42 and 43 operated by the first and second mute signals output from the first and second mute controllers 20 and 30 and the third mute signal output from the microcomputer 1 of the CD-ROM system to mute an audio signal output from a first and second amplifiers 11 and 12 of the CD-ROM system and connected to outside (line and head phone) terminals.

Preferably, the first muting circuit 41 includes a transistor TR2 operated by the first and second mute signals output from the first and second mute controllers 20 and 30 and the third mute signal output from the microcomputer 1 of the CD-ROM system to mute the digital signal output from a digital signal processor 7. The second muting circuit 42 includes a transistor TR3 operated by the first and second mute signals output from the first and second mute controllers 20 and 30 and the third mute signal output from the microcomputer 1 of the CD-ROM system as well as transistors TR4 and TR5 for muting the audio signal, in cooperation with the transistor TR3, and being output by first amplifier 11 of the CD-ROM system to outside (line) terminal.

The third muting circuit 43 advantageously includes:

a transistor TR6 operated by the first and second mute signals output from the first and second mute controllers 20 and 30 and the third mute signal output from the microcomputer 1 of the CD-ROM system; and transistors TR7 and TR8 for muting the audio signal, in cooperation with the transistor TR6, being output from second amplifier 12 of the CD-ROM system to mute the audio signal output to the outside (head phone) terminal.

The CD-ROM system thus constructed advantageously comprises:

a microcomputer 1 for generating the third mute signal for cutting off an output of the audio signal during mechanical operations such as a track jump operation and the like to control an operation of the system;

a servo circuit 5 controlled by the microcomputer 1 to control a spindle motor 6;

a pick-up 3 for reading information data and audio data from a disc 2 rotated by the spindle motor 6;

a radio-frequency RF amplifier 4 for amplifying the data read by the pick-up 3;

a first digital signal processor 7 for receiving the data amplified by the RF amplifier 4 through the servo circuit 5 to process the same;

a second digital signal processor 8 controlled by the microcomputer 1 and for processing the information data out of the data output from the first digital signal processor 7 to output the same;

a Digital-to-Analog Converter (DAC) 9 for receiving the digital data output from the first digital signal processor 7 through a resistor R16 to convert the same to an analog signal;

a Low Pass Filter (LPF) 10 for passing a low band signal of audio component from the signal converted by the DAC 9;

a first amplifier 11 for amplifying the signal that has passed the LPF to output the same to the outside (line); and a second amplifier 12 for amplifying the signal amplified by the first amplifier 11 to output the same to the outside (head phone).

Next, an operational sequence of the digital noise blanking circuit of the CD-ROM system depicted in FIG. 1, which is constructed in accordance with the present invention, will be described.

If the power is turned ON in FIG. 1, a supply voltage Vcc is input to the condenser C1 and the transistor TR1 via the diode D1 of the first mute controller 20. Condenser C1 is charged by the supply voltage Vcc to operate the transistor TR1. When transistor TR1 is operated, a current generated by the supply voltage Vcc is output through diode D2. The current output from the first mute controller 20, i.e., the first mute signal, is provided to the first, second and third muting circuits 41, 42 and 43, respectively.

The transistors (TR2), (TR3, TR4, TR5) and (TR6, TR7, TR8) of the first, second and third muting circuits, respectively, are advantageously activated by the first mute signal. When the transistors (TR2), (TR3, TR4, TR5) and (TR6, TR7, TR8) of the respective first, second and third muting circuits are activated, the digital signal output from the first digital signal processing (DSP) circuit 7 of the CD-ROM system and then input to the DAC 9 through a resistor R16, and the signal output from the first and second amplifiers 11 and 12 connected to output terminals, e.g., line and head phone terminals, are muted. Meanwhile, the supply voltage Vcc is input to the mute control circuit of the first mute controller 20. Preferably, the supply voltage Vcc is input to the condenser C2 through a resistor R8. The condenser C2 operates at a predetermined time constant, e.g., 1=R8×C2, in response to application of supply voltage Vcc to start condenser charging.

If the charging voltage of condenser C2 is above an operating voltage of the zener diode ZD1, a transistor TR9 is activated by the charging voltage of condenser C2. When transistor TR9 is activated, the transistor TR1 of the mute signal output circuit advantageously can be rendered inactive. When the transistor TR9 of the mute signal output circuit is activated, an output of the first mute control signal is stopped and, preferably, the operation of muting circuit 40 is also stopped.

When the operation of the muting circuit 40 is stopped, the signal processed by the first DSP circuit 7 is input to the DAC 9 through the resistor R16. Preferably, DAC 9 converts an incoming digital signal to an outgoing analog signal and the LPF 10 passes an audio signal below a predetermined frequency among the signals output from DAC 9. The audio signal which is passed by LPF 10 is amplified by the first amplifier 11 and output to an output terminal, e.g., the line terminal and, at the same time, is output to second amplifier 12.

The second amplifier 12 amplifies the audio signal input from the first amplifier 11 and provides the amplified signal to another output terminal, e.g., the head phone terminal. In other words, the noise generated during the power-on state change is muted but, after a predetermined period of time, the muting is stopped so that the audio signal can be output.

Figure 2:
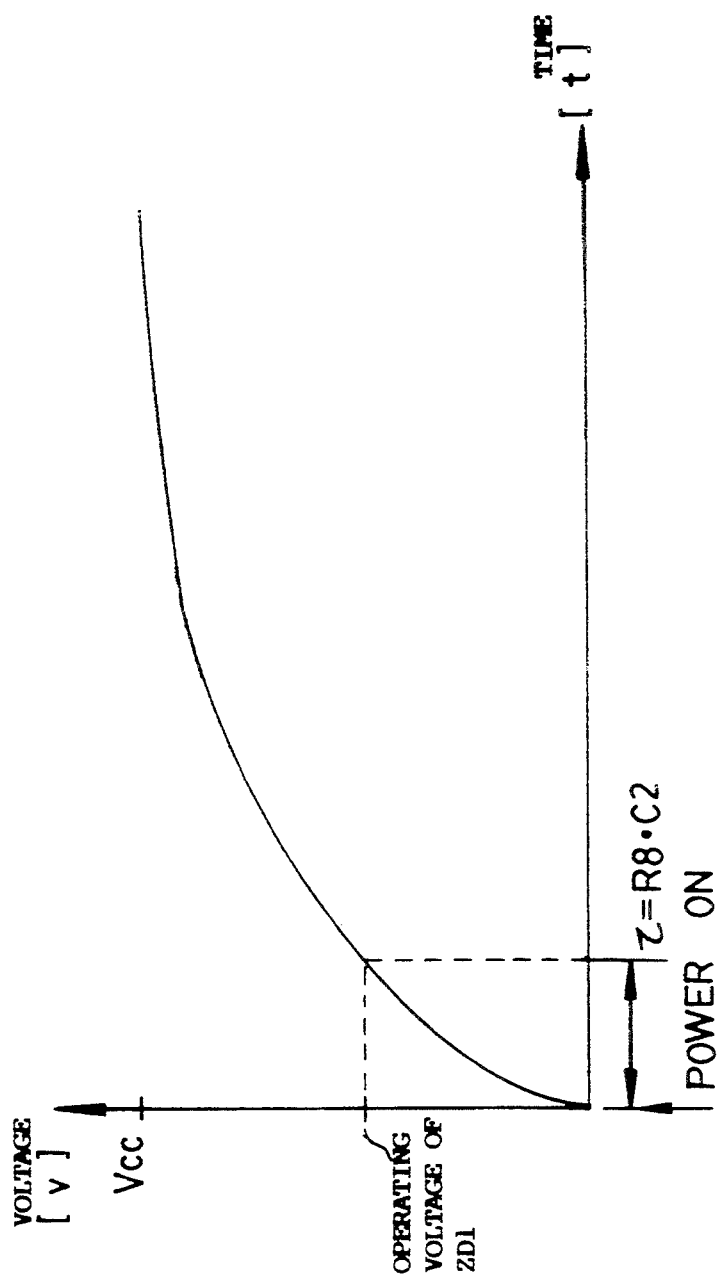
FIG. 2 is a characteristic diagram for illustrating an operational state of a zener diode.

FIG. 2 is a characteristic diagram for illustrating an operational state of the zener diode ZD1. According to FIG. 2, if the power is turned on, the condenser C2 is charged according to a predetermined time constant according to the formula $1=R8 \times C2$ by the supply voltage Vcc. If the charging voltage of the condenser C2 is above an operating voltage of the zener diode ZD1, the transistor TR9 of the first mute controller in FIG. 1 is activated. It will be noted that if the power is turned ON, the muting is started. Thereafter, if the charging voltage of the condenser C2 is above the operating voltage of the zener diode ZD1, the muting function is released. Furthermore, the supply voltage Vcc is input to the second mute controller 30. Supply voltage Vcc is divided by resistors R9 and R10 through the zener diode ZD2 and is input to the AND gate A1, which in turn outputs a high level signal. It will be appreciated that the high level signal output by the logic device is a logic level signal.

The condenser C3 has an associated predetermined time constant, i.e., $1=R14 \times C3$, and condenser C3 is charged by the high level signal. In other words, as illustrated in FIG. 3A, the condenser C3 on a point where the power is turned according to predetermined time constant ($1=R14 \times C3$, as illustrated in FIG. 3B.

The external RESET terminal RST of the second mute control signal receives, during the power-on state change, a re-set signal of high level simultaneously with the power-on, as illustrated in FIG. 3B. Accordingly, the AND gate A2 of the second mute controller 30, as illustrated in FIG. 3D, outputs a low level signal before an input (a) on one end becomes a gate level Vg recognized as high. Hence, if the charging voltage of the condenser C3 becomes a gate level recognized as high, the AND gate A2 outputs a high level signal.

The microcomputer 1, as illustrated in FIG. 3D, is re-set when an output (b) of the AND gate A2 is a low level signal. A condenser C4 is charged with an associated time constant $1=R15 \times C4$ to remove the noise component. The output (b) of the AND gate A2 is inverted by the inverter I to output (c), e.g., the waveform illustrated in FIG. 3E.

The switching transistors TR2, TR3 and TR6 of the muting circuit 40 are activated by the waveform of high level, as illustrated in FIG. 3E. Accordingly, the output of the audio signal is cut off during the re-set period of the microcomputer 1.

Meanwhile, if the re-set pulse, e.g., low level signal RST, is input during the operation of the CD-ROM system, a low level pulse signal is output from the AND gate A2 of the second mute controller 30 to re-set the microcomputer 1. The low level pulse signal output from the AND gate A2 is inverted by the inverter I, and the muting circuit 40 is operated by the inverted high level pulse signal to cut off the output of the audio signal during the re-set period of the microcomputer 1.

Furthermore, the voltage charged in the condenser C2 of the first mute controller 20 drops below the operating voltage of the zener diode ZD1 during the power OFF state, so that the transistor TR9 is deactivated. If transistor TR9 is rendered inactive, the transistor TR1 is operated by the charging voltage of the condenser C1. If the transistor TR1 is operated, the first mute signal is output from the first mute controller 20 to operate the muting circuit 40. When the muting circuit 40 is operated, the audio signal output from the CD-ROM system is muted.

At this moment, because the charging voltage of the condenser C1 is not connected to the usual discharging loop, the charging voltage is discharged over a predetermined period of time to activate the transistor TR1. Moreover, since the charging voltage of the condenser C2 is discharged instantly through a diode D4, the noise generated during the power OFF state can be cut off.

More specifically, if the charging voltage of the condenser C2 drops below an added voltage (Vzdl+Vd5=Vbe=operating voltage Vzdl of the zener diode ZD1+operating voltage Vd5 of the diode D5+voltage Vbe between a base and an emitter of the transistor TR9), the transistor TR9 is rendered off to effectively cut off the output of the noise during the power OFF state.

Furthermore, the microcomputer 1 outputs the third mute signal to a mute terminal during such mechanical operations of the system as track jump and the like. The third mute signal operates the muting circuit 40 through the diode D3 so that the output of audio signal is cut off during the mechanical operations of the system.

In the construction thus described, diodes D2, D7 and D3 connected to an output terminal of the first and second mute controllers 20 and 30 and connected to a mute terminal of the microcomputer 1 prevent signals generated from other circuits from being input to the above muting circuit.

As seen from the foregoing, the digital noise blanking circuit of CD-ROM system in accordance with the present invention obtains an effect of cutting off the noise output to the outside during the power on/off, re-set and the mechanical operations.

The foregoing description of the preferred embodiment has been presented for the purpose of illustration and description. It is not intended to limit the scope of this invention. Many modifications and variations are possible in light of above teaching.

More specifically, the CD-ROM system applied to the present invention is an embodiment and it should be apparent that a CD-ROM system similar to the same can be applied to the present invention.

Furthermore, although the present invention has described in detail about the resistors, transistors and the like, in practice many variations are possible to those skilled in the art without departing from the technical fields of the present invention.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A digital noise blanking circuit for a CD-ROM system, the circuit comprising:
   a first mute controller for providing a first mute signal for eliminating digital noise generated during a power on/off state change;

a second mute controller for providing a second mute signal for eliminating said digital noise generated during a reset operation of a computer; and a muting circuit for cutting off said digital noise generated from an audio output terminal of the CD-ROM system in response to a selected one of said first and second mute signals output from the first and second mute controllers and a third mute signal output from a microcomputer of the CD-ROM system.

2. The digital noise blanking circuit for a CD-ROM system as defined in claim 1, wherein the first mute controller comprises:

a mute signal output circuit for providing the first mute signal during a power on/off state change; and a mute control circuit for controlling the mute signal output circuit to thereby stop generation of the first mute signal if a predetermined period of time elapses after the power-on.

3. The digital noise blanking circuit for a CD-ROM system as defined in claim 2, wherein the mute signal output circuit comprises:

a transistor for operating during the power on/off to thereby output the first mute signal;

a condenser for maintaining an operating state of the transistor for a predetermined period of time by way of a charging voltage during the power OFF state;

a diode for suppressing a discharge of the charging voltage in the condenser during the power OFF state; and a diode for cutting off a signal input to an output terminal from an outside.

4. The digital noise blanking circuit for a CD-ROM system as defined in claim 2, wherein the mute control circuit comprises:

a condenser for being charged with a predetermined time constant during the power-on;

a zener diode for operating if the voltage charged in the condenser exceeds a predetermined level; and a transistor for cooperating with the zener diode to thereby control the transistor of the mute signal output circuit, so that the first mute signal can be cut off.

5. The digital noise blanking circuit for a CD-ROM system as defined claim 1, wherein the second mute controller comprises:

a delay circuit for providing a re-set hold signal during a microcomputer reset time when the power is turned on; and a signal output circuit for providing the re-set hold signal coming from the delay circuit, the second mute signal in response to an external re-set signal and a re-set signal.

6. The digital noise blanking circuit for a CD-ROM system as defined in claim 5, wherein the delay circuit comprises:

a zener diode for operating when a power source is above a predetermined voltage;

an AND gate for providing a voltage of logic level in accordance with a power source voltage of logic level in accordance with a power source voltage input through the zener diode; and a condenser for being charged with a predetermined time constant when the voltage of logic level coming from the AND gate is input.

7. The digital noise blanking circuit for a CD-ROM system as defined in claim 5, wherein the signal output circuit comprises:

an AND gate for providing the re-set signal to the microcomputer when the voltage charged in the condenser of the delay circuit is of a predetermined level and an external re-set signal of logic level is applied;

a condenser for eliminating a noise component from the re-set signal to thereby output the same to a RESET terminal of the microcomputer when the re-set signal is input from the AND gate;

an inverter for inverting the re-set signal removed of the noise by the condenser to thereby output the second mute signal; and a diode for cut off a signal input into an output terminal from the outside.

8. The digital noise blanking circuit for a CD-ROM system as defined in claim 1, wherein the muting circuit comprises:

a first muting circuit operated by the first and second mute signals output from the first and second mute controller and a third mute signal output from the microcomputer of the CD-ROM system to thereby mute said digital signal output from the CD-ROM system; and a second and third muting circuits operated by the first and second mute signals output from the first and second mute controller and the third mute signal output from the microcomputer of the CD-ROM system to thereby mute an audio signal output from a first and second amplifiers of the CD-ROM system and output to the outside.

9. The digital noise blanking circuit for a CD-ROM system as defined in claim 8, wherein the first muting circuit comprises:

a transistor operated by the first and second mute signals output from the first and second mute controller and the third mute signal output from the microcomputer of the CD-ROM system to thereby mute said digital signal output from the CD-ROM system.

10. The digital noise blanking circuit for a CD-ROM system as defined in claim 8, wherein the second muting circuit comprises:

a transistor operated by the first and second mute signals output from the first and second mute controller and the third mute signal output from the microcomputer of the CD-ROM system; and transistors for muting the audio signal being cooperative with the transistor and being output from the first amplifier of the CD-ROM system to thereby be output to the outside.

11. The digital noise blanking circuit for a CD-ROM system as defined in claim 8, wherein the third muting circuit comprises:

a transistor operated by the first and second mute signals output from the first and second mute controller and the third mute signal output from the microcomputer of the CD-ROM system; and transistors for muting the audio signal being cooperative with the transistor and being output from the second amplifier of the CD-ROM system to thereby mute audio signal output to the outside.

12. A digital noise blanking circuit for a CD-ROM system as defined in claim 8, wherein the third mute signal is generated from the microcomputer during a mechanical operation reading no data from the system.

13. The digital noise blanking circuit for a CD-ROM system as defined in claim 1, wherein the CD-ROM system comprises:
- a microcomputer for generating the third mute signal for cut off an output of the audio signal during an mechanical operation and for providing a signal for controlling an operation of the system;
- a servo circuit controlled by the microcomputer to thereby control a spindle motor;
- a pick-up for reading an information data and audio data from a disc rotated by the spindle motor;
- a radio-frequency amplifier for amplifying the data read by the pick-up;
- a first digital signal processor for receiving the data amplified by the radio frequency amplifier through the servo circuit to thereby process the same;
- a second digital signal processor controlled by the microcomputer and for processing the information data out of the data output from said first digital signal processor to thereby output the same;
- a Digital-to-Analog Converter for receiving the digital data output from the first digital signal processor to thereby convert the same to an analog signal;
- a low pass filter for passing a low band signal of audio component from the signal converted by the digital-to-analog converter;
- a first amplifier for amplifying the signal that has passed the low pass filter to thereby output the same to the outside; and
- a second amplifier for amplifying the signal amplified by the first amplifier to thereby output the same to the outside.

14. The digital noise blanking circuit of CD-ROM system as defined in claim 1, wherein the third mute signal is generated from the microcomputer during a mechanical operation permitting no reading of data from the system.

15. A digital noise blanking circuit for a CD-ROM system, the circuit comprising:
- first mute control means for providing a first mute signal for eliminating digital noise generated during a power on/off state change;
- second mute control means for providing a second mute signal for eliminating said digital noise generated during a reset operation of a computer; and
- muting means for eliminating said digital noise generated from an audio output terminal of the CD-ROM system in response to as selected one of said first and said second mute signals and a third mute signal output from a microcomputer of the CD-ROM system.

16. The digital noise blanking circuit for a CD-ROM system as defined in claim 15, wherein the first mute control means comprises:
- a mute signal output circuit for providing the first mute signal during a power on/off state change; and
- a mute control circuit for controlling the mute signal output circuit to thereby stop generation of the first mute signal if a predetermined period of time elapses after the power-on.

17. The digital noise blanking circuit for a CD-ROM system as defined claim 15, wherein the second mute control means comprises:
- a delay circuit for providing a re-set hold signal during a microcomputer reset time when the power is turned on; and
- a signal output circuit for providing the re-set hold signal coming from the delay circuit, the second mute signal in response to an external re-set signal and a re-set signal.

18. The digital noise blanking circuit for a CD-ROM system as defined in claim 15, wherein the muting means comprises:
- first muting means operated by the first and the second mute signals output from the first and the second mute control means, respectively, and the third mute signal output from the microcomputer of the CD-ROM system to thereby mute said digital signal output from the CD-ROM system; and
- second and third muting means operated responsive to said first, said second and said third mute signals to thereby mute an audio signal output from a first and second amplifiers of the CD-ROM system and output to the outside.

19. The digital noise blanking circuit for a CD-ROM system as defined in claim 15, wherein the CD-ROM system comprises:
- a microcomputer for generating the third mute signal for elimination of an output of the audio signal during an mechanical operation and for providing a signal for controlling an operation of the system;
- a servo circuit controlled by the microcomputer to thereby control a spindle motor;
- a pick-up for reading an information data and audio data from a disc rotated by the spindle motor;
- a radio-frequency amplifier for amplifying the data read by the pick-up;
- a first digital signal processor for receiving the data amplified by the radio frequency amplifier through the servo circuit to thereby process the same;
- a second digital signal processor controlled by the microcomputer and for processing the information data out of the data output from said first digital signal processor to thereby output the same;
- a Digital-to-Analog Converter for receiving the digital data output from the first digital signal processor to thereby convert the same to an analog signal;
- a low pass filter for passing a low band signal of audio component from the signal converted by the digital-to-analog converter;
- a first amplifier for amplifying the signal that has passed the low pass filter to thereby output the same to the outside; and
- a second amplifier for amplifying the signal amplified by the first amplifier to thereby output the same to the outside.

20. The digital noise blanking circuit of CD-ROM system as defined in claim 15, wherein the third mute signal is generated from the microcomputer during a mechanical operation permitting no reading of data from the system.

* * * * *